United States Patent
Li et al.

(10) Patent No.: US 8,590,426 B2
(45) Date of Patent: Nov. 26, 2013

(54) MULTI-AXIS TRANSMISSION

(75) Inventors: Shen-Chun Li, Tu-Cheng (TW);
Hsien-Chuan Liang, Tu-Cheng (TW);
Shou-Kuo Hsu, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 388 days.

(21) Appl. No.: 13/032,723

(22) Filed: Feb. 23, 2011

(65) Prior Publication Data

US 2012/0115664 A1 May 10, 2012

(30) Foreign Application Priority Data

Nov. 5, 2010 (TW) .............................. 99138267 A (51) Int. Cl.
*B25J 17/00* (2006.01)

(52) U.S. Cl.
USPC .................. 74/665 H; 74/490.03; 74/490.05; 74/490.06; 901/26; 901/28

(58) Field of Classification Search
USPC .................. 74/665 F, 665 H, 490.03, 490.05, 74/490.06; 901/25, 26, 28, 29
See application file for complete search history.

(56) References Cited

U.S. PATENT DOCUMENTS

| | | | | |
|---|---|---|---|---|
| 1,210,874 A | * | 1/1917 | Waite | 74/343 |
| 2,330,296 A | * | 9/1943 | Lundberg | 74/665 H |
| 3,406,795 A | * | 10/1968 | Pickles | 477/12 |
| 4,502,347 A | * | 3/1985 | Norris et al. | 74/417 |
| 4,606,695 A | * | 8/1986 | Lenz | 414/735 |
| 4,662,814 A | * | 5/1987 | Suzuki et al. | 414/730 |
| 4,900,997 A | * | 2/1990 | Durand et al. | 318/568.2 |
| 4,964,503 A | * | 10/1990 | Nishiyama et al. | 192/12 D |
| 5,009,296 A | * | 4/1991 | Ohkawa et al. | 192/20 |
| 5,249,479 A | * | 10/1993 | Torii et al. | 74/479.01 |
| 7,454,995 B2 | * | 11/2008 | Koyama et al. | 74/490.05 |

* cited by examiner

*Primary Examiner* — William C Joyce
(74) *Attorney, Agent, or Firm* — Altis & Wispro Law Group, Inc.

(57) ABSTRACT

An multi-axis transmission includes a frame, a motor, a housing, a first output mechanism, a second output mechanism, and a output control mechanism. The motor is secured to the frame, the motor includes a rotary shaft. The housing is axially slidably attached to the frame. The first output mechanism is secured to the frame. The second output mechanism is rotatably attached to the housing. The output control mechanism is secured to the rotary shaft, the output control mechanism is selected to engage the first output mechanism to output a first movement or to engage the second output mechanism to output a second movement angular with the first moment.

12 Claims, 7 Drawing Sheets

MULTI-AXIS TRANSMISSION

BACKGROUND

1. Technical Field

The disclosure generally relates to multi-axis transmissions and, particularly, to a multi-axis transmission for use with a single motor.

2. Description of Related Art

Two or more motors are often used to output power for an apparatus where movement along more than one axis is desired. Multiple motors can take up too much space, making it difficult to decrease the volume of the apparatus and making the apparatus expensive to produce and maintain.

Therefore, there is room for improvement within the art.

BRIEF DESCRIPTION OF THE DRAWINGS

Many aspects of the exemplary multi-axis transmission can be better understood with reference to the following drawings. The components in the drawings are not necessarily drawn to scale, the emphasis instead being placed upon clearly illustrating the principles of the multi-axis transmission. Moreover, in the drawings, like reference numerals designate corresponding parts throughout the several views, in which.

DETAILED DESCRIPTION

The disclosure is illustrated by way of example and not by way of limitation in the accompanying drawings. It should be noted that references to "an" or "one" embodiment in this disclosure are not necessarily to the same embodiment, and such references can include the meaning of "at least one" embodiment where the context permits.

Figure 1:
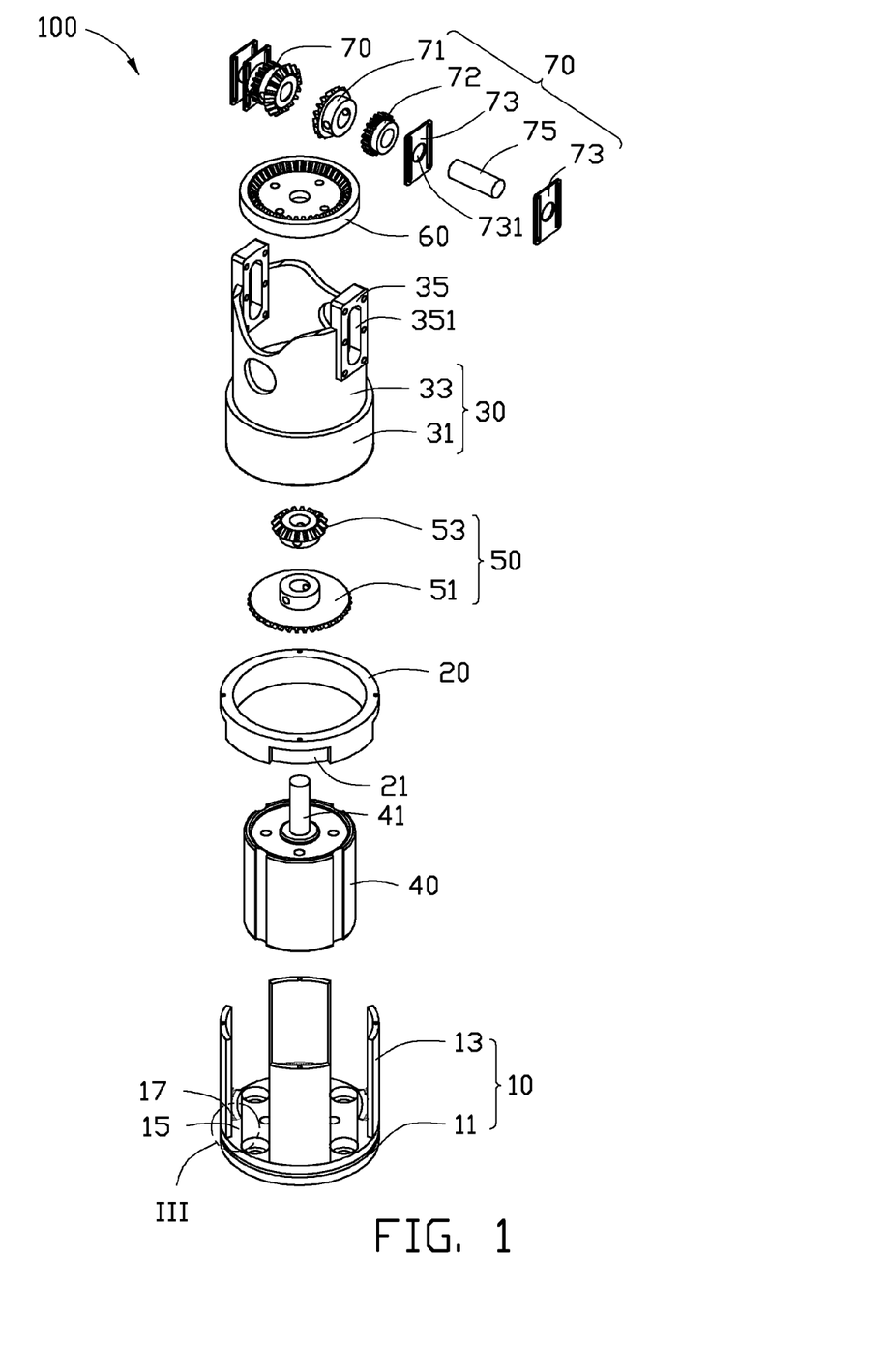
FIG. 1 is an explored, isometric view of an exemplary embodiment of a multi-axis transmission.

FIG. 1 illustrates a multi-axis transmission 100 for apparatus where movements along more than one axis are desired. The multi-axis transmission 100 includes a frame 10, a positioning element 20, a housing 30, a motor 40, an output control mechanism 50, a first output mechanism 60, and two second output mechanisms 70. The motor 40 includes a first end and a second end opposite to the first end. A rotary shaft 41 oriented at the first end of the motor 40. The second end of the motor 40 is secured to the frame 10. The positioning element 20 is secured to frame 10 to limit the movement of the housing 30 in a direction along the axis of the motor 40. One end of the housing 30 is slidably attached to the frame 10. The output control mechanism 50 is secured to the rotary shaft 41. The first output mechanism 60 is secured to the housing 30, and the second output mechanisms 70 are rotatably mounted on the housing 30. When the housing 30 moves in a direction along the axis of the motor 40, the output control mechanism 50 is used to engage with the first mechanism 60 or the second output mechanisms 70 to control the direction of moment outputted.

Figure 3:
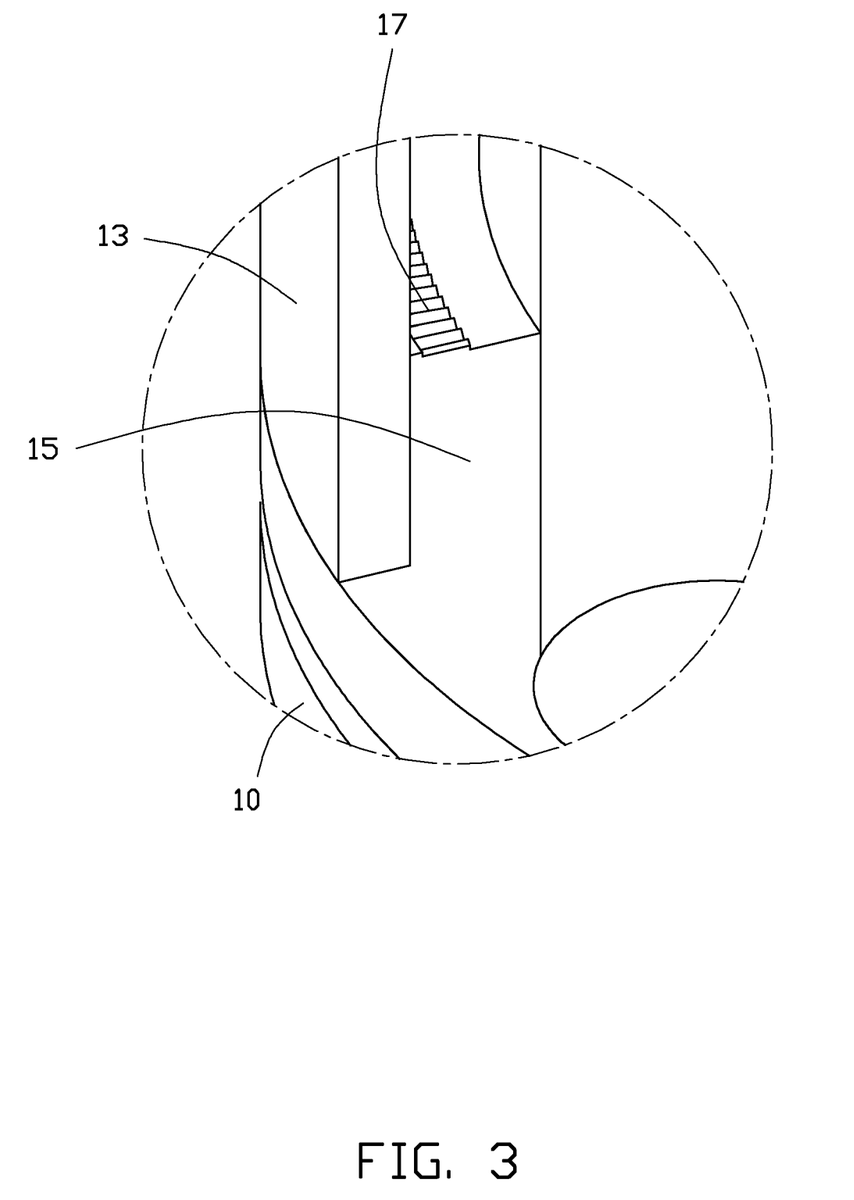
FIG. 3 is an enlarged view of the III circle portion of FIG. 1.

In the exemplary embodiment, the frame 10 includes a disk portion 11 and a number of spaced apart side plates 13 extending from the disk portion 11. Referring especially to FIG. 3, an electromagnet 15 is secured to the inner surface of each side plate 13. A number of striations 17 are formed on the surface of each electromagnet 15.

The positioning element 20 is substantially toroidal. A number of cutouts 21 are defined in the outer surface of the positioning element 20 to receive the free end of each side plate 13.

Figure 2:
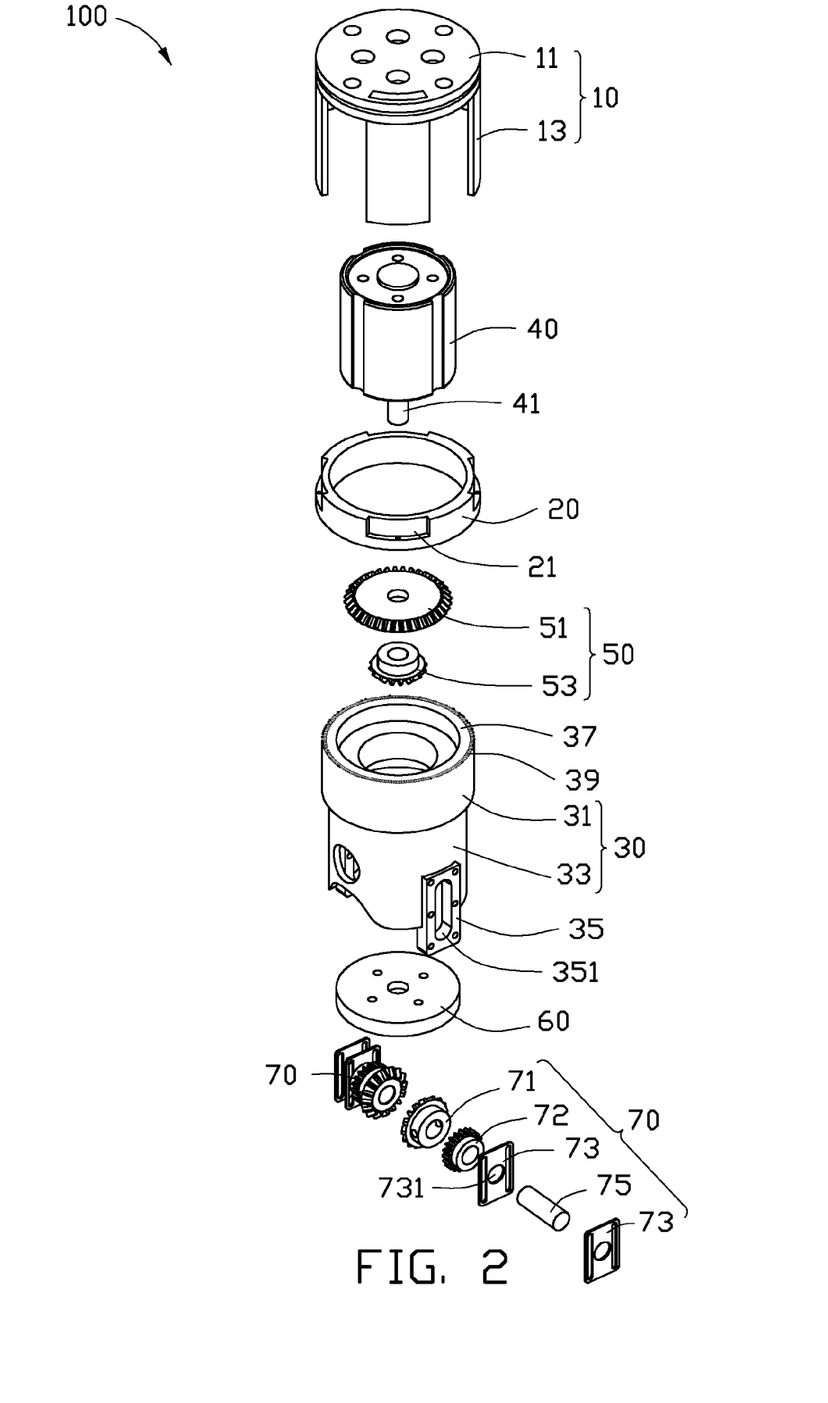
FIG. 2 is similar to FIG. 1, but viewed from another aspect.

Refer to FIGS. 1 and 2, the housing 30 includes a base portion 31, a barrel portion 33, and two flat portions 35. The base portion 31 is slidably received in the frame 10. The external diameter of base portion 31 is larger than the external diameter of the barrel portion 33. The first output mechanism 60 is secured to the inner surface of the barrel portion 33. The two flat portions 35 are formed at opposite sides of the barrel portion 33 to mount the second output mechanisms 70. The base portion 31 and the barrel portion 33 are substantially hollow cylindrical. A through hole 351 is defined in each flat portion 35. A magnetic element 37 is secured to the base portion 31 to attract or repel the electromagnets 15. A number of protrusions 39 project from the base portion 31 at the end opposite to the barrel portion 33 to mesh with the striations 17 of the frame 10.

The output control mechanism 50 includes a first driving gear 51 and a second driving gear 53. In the exemplary embodiment, the first and second driving gears 51 and 53 are conical gears. The first and second driving gears 51 and 53 are secured to the rotary shaft 41 of the motor 40. The teeth of the first and second gears 51 and 53 face in opposite directions.

In the exemplary embodiment, the first output mechanism 60 is an internal conical gear. The first output mechanism 60 meshes with the first driving gear 51.

Each second output mechanism 70 includes a slave element 71, a driving element 72, two retaining elements 73, and a revolving shaft 75. The revolving shaft 75 is pivotally attached to the flat portion 35 by the retaining elements 73. The slave element 71 and the driving element 72 are secured to the revolving shaft 75. The slave element 71 meshes with the second driving gear 53. The driving element 72 outputs movement.

In the exemplary embodiment, the slave element 71 is a conical gear. The driving element 72 is a cylindrical gear. A shaft hole 731 is defined in the retaining element 73 to receive the revolving shaft 75.

Figure 4:
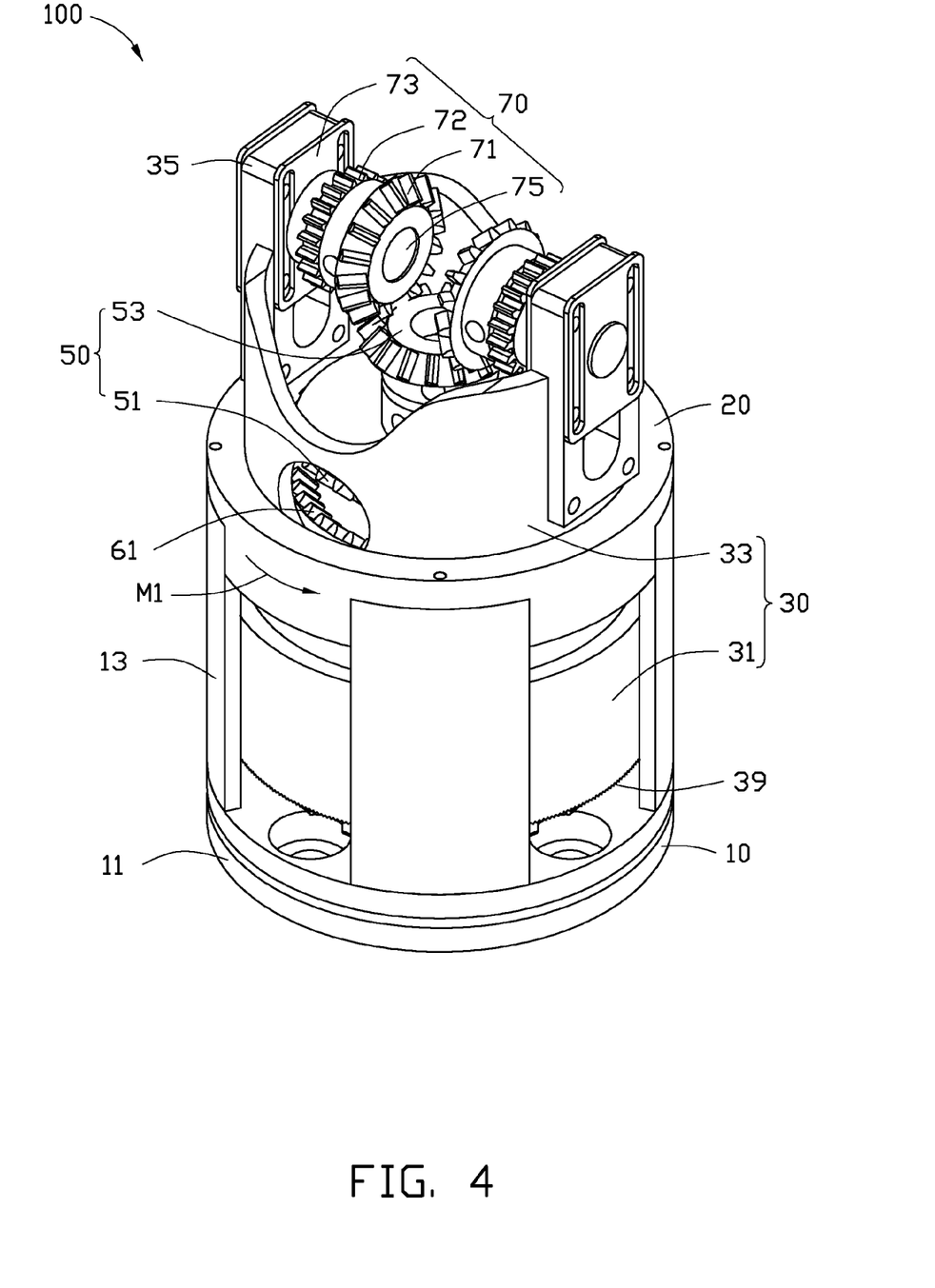
FIG. 4 is an assembled view of the multi-axis transmission of FIG. 1.

Referring to FIG. 4, during assembly, the motor 40 is received in the frame 10 and is secured to the disk portion 11. The first output mechanism 60 is secured to the inner surface of the barrel portion 33. The rotary shaft 41 passes through the first output mechanism 60. The first and second driving gears 51 and 53 are secured to the rotary shaft 41, and the tooth surface of the first driving gear 51 faces the first output mechanism 60.

The second output mechanisms 70 are attached to the flat portions 35 of the housing 30. Each revolving shaft 75 passes through the corresponding through hole 351 of the flat portion 35. The retaining elements 73 are secured to opposite sides of the flat portion 35, with the revolving shaft 75 extending through the shaft holes 731. The slave element 71 and the driving element 72 are secured to the revolving shaft 75. The housing 30 with the first and second output mechanisms 60 and 70 is slidably received in the frame 10. The positioning element 20 is placed around the barrel portion 33 of the housing 30, and is secured to the frame 10. The free end of each side plate 13 is received in the corresponding cutout 21 of the positioning element 20. Thus, the multi-axis transmission 100 is assembled.

Figure 6:
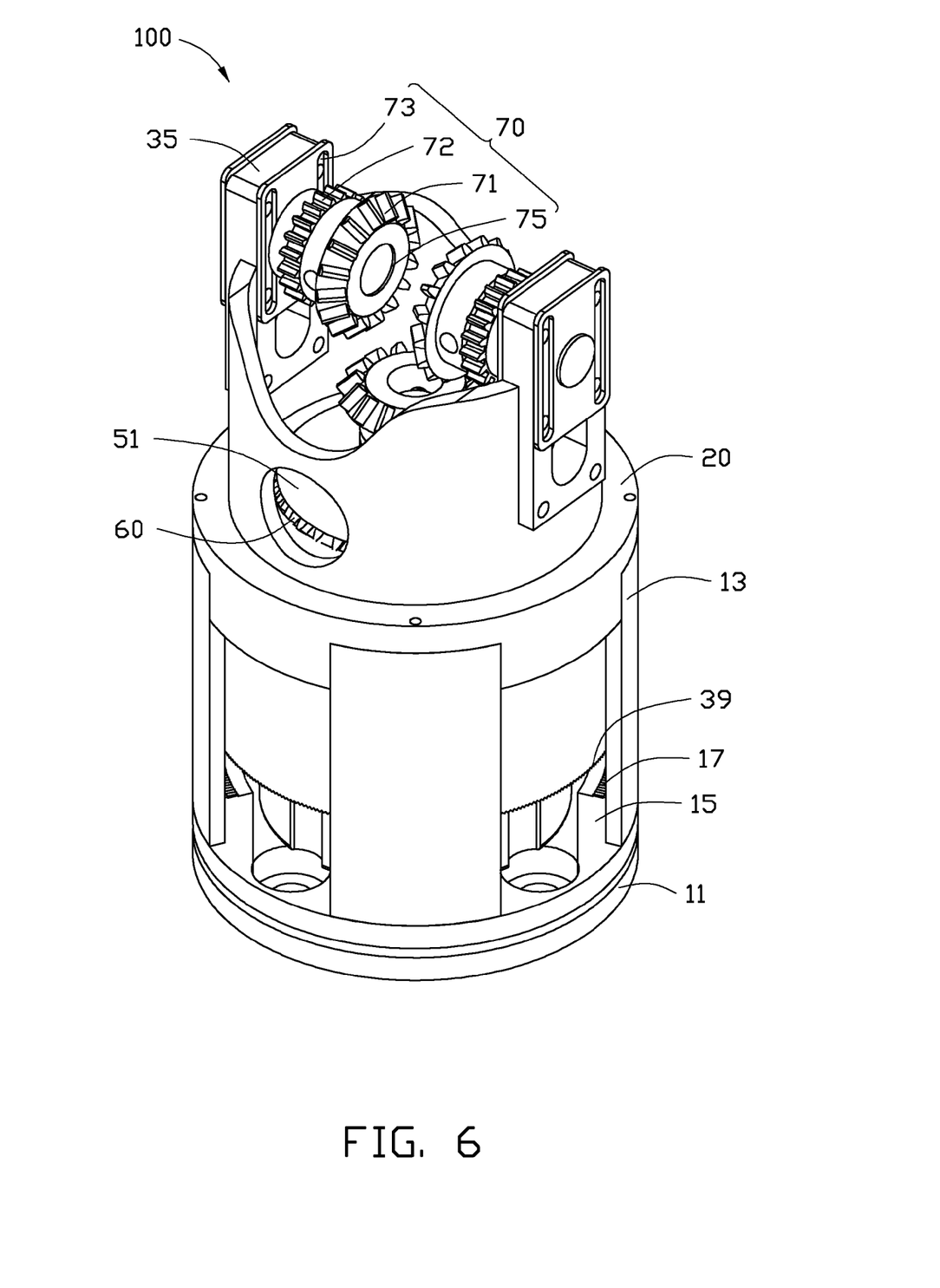
FIG. 6 is similar to FIG. 4, but showing the multi-axis transmission in another state.
Figure 7:
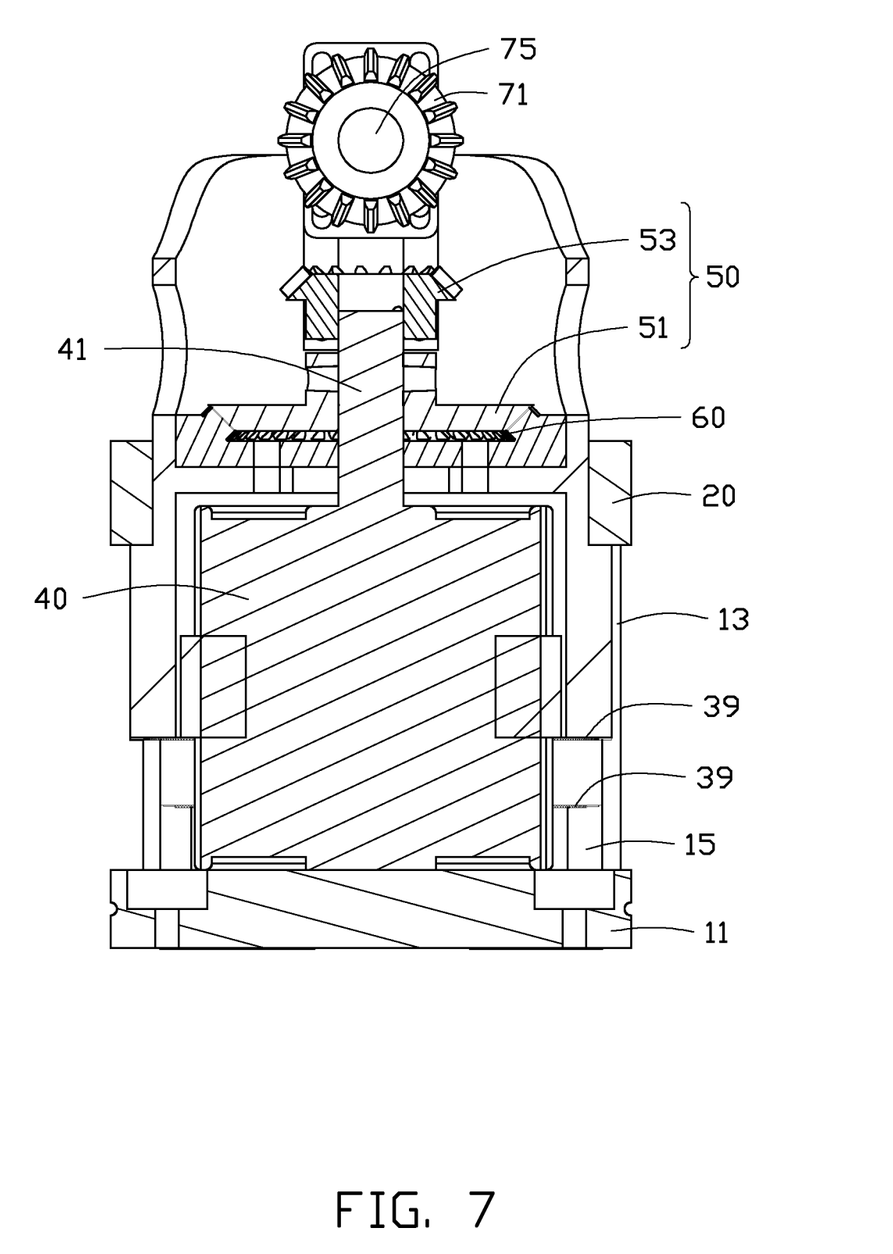
FIG. 7 is a cross section view of the multi-axis transmission of FIG. 6.

When the multi-axis transmission 100 is assembled, the housing 30 is slidably attached to the frame 10 and is retained by the positioning element 20. The output control mechanism 50 can be selected to mesh with the first output mechanism 60 or the second output mechanisms 70. When the output control mechanism 50 meshes with the first output mechanism 60, the housing 30 is driven to rotate around the axis of the motor 40. The protrusions 39 mesh with the striations 17 of the frame 10. The electromagnet 15 is powered on and attracts the magnetic element 37, thus, the multi-axis transmission 100 is in a first state and output movement M 1 around the axis of the motor 40, as shown in FIGS. 6 and 7.

Figure 5:
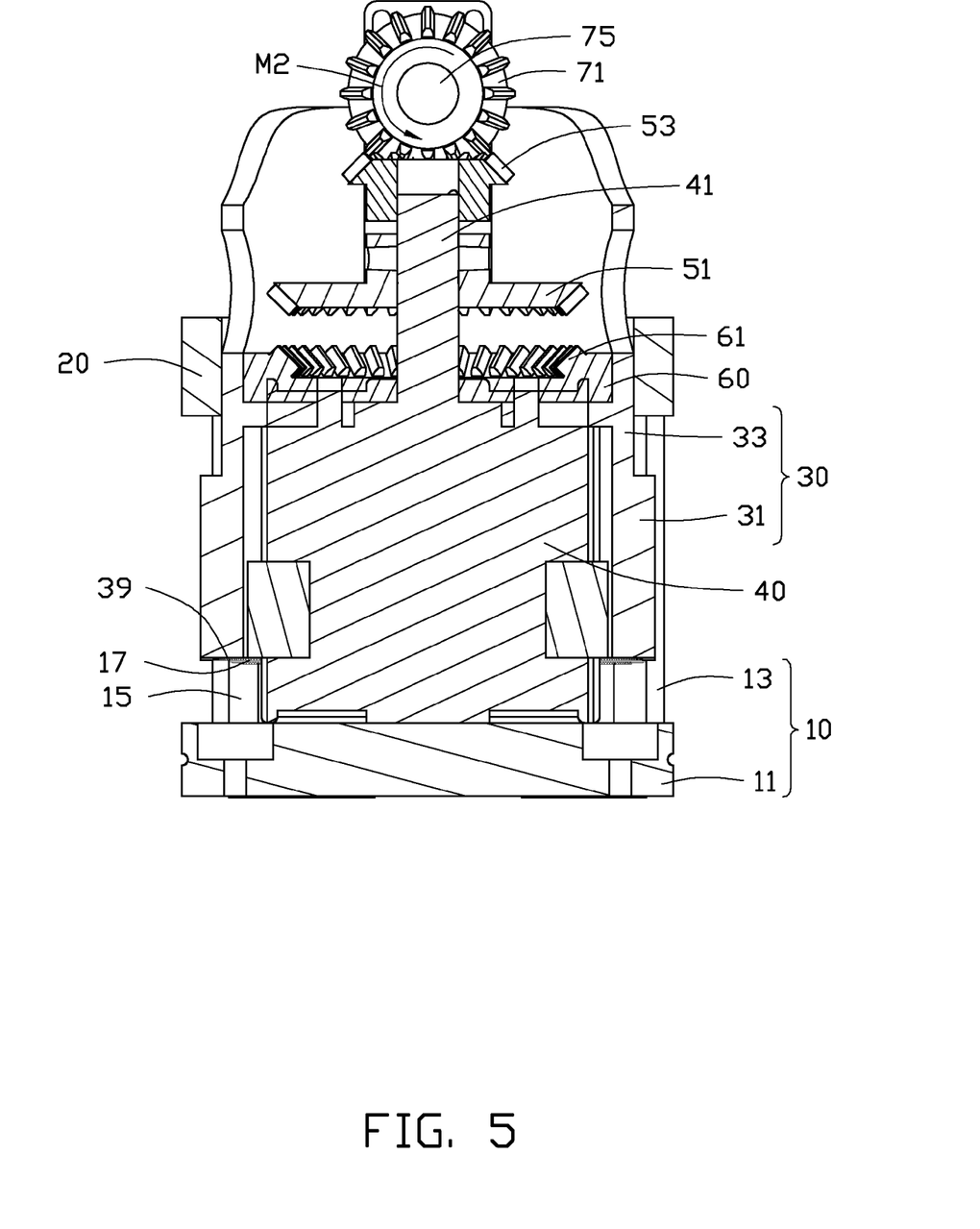
FIG. 5 is a cross section view of the multi-axis transmission of FIG. 4.

When the output control mechanism 50 meshes the slave element 71 of each second output mechanism 70, the corresponding driving element 72 is driven to output movement M 1 around the axis of the revolving shaft 75. The electromagnet 15 repels the magnetic element 37 of the housing 30. Thus, the multi-axis transmission 100 is in a second state and outputs movement around the axis of the revolving shaft 75, as shown in FIGS. 4 and 5.

To change the multi-axis transmission 100 from the first state to the second state, direction of polarity of the electromagnet 15 is reversed. The electromagnet 15 attracts the magnetic element 37 to draw the housing 30 to slide toward the frame 10 in a direction along the axis of the motor 40. When the housing 30 moves, the first driving gear 51 is separated from first output mechanism 60, and the second output mechanisms 70 is moved toward the second driving gear 53. When the housing 30 further slides toward the frame 10 until the protrusions 39 mesh with the striations 17 of the frame 10, the second driving gear 53 meshes with the slave elements 71 to output moment M 2, thus, the output state of the multi-axis transmission 100 is switched.

To change the multi-axis transmission 100 from the second state to the first state, direction of polarity of the electromagnet 15 is reversed. The electromagnet 15 repels the magnetic element 37 to push the housing 30 to slide away from the frame 10. When the housing 30 moves, the first output mechanism 60 is moved toward the first driving gear 51 and the second driving gear 53 separates from the slave elements 71 of the second output mechanisms 70. The housing 30 is further pushed to slide away from the frame 10 until the first driving gear 51 meshes with the first output mechanism 60 to output moment M 1. Thus, the output state of the multi-axis transmission 100 is switched.

The number of the second output mechanism 70 can be decreased or can be increased as desired. The output control mechanism 50 can be replaced by a shaft with two spaced apart worm screws, accordingly, the first output mechanism 60 and the slave elements 71 of the second output mechanisms 70 can be replaced by worm gears.

The exemplary embodiments of the multi-axis transmission 100, the housing 30 is slidably attached to the frame 10, the output control mechanism 50 selects to mesh with the first or second output mechanism 60 or 70, the movement output can be changed. The multi-axis transmission 100 with a single motor to provide movements in different directions, thus it is convenient to use.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A multi-axis transmission comprising:
a frame;
a motor secured to the frame, the motor comprising a rotary shaft;
a housing, the housing axially slidably attached to the frame;
a first output mechanism secured to the housing;
a second output mechanism rotatably attached to the housing, the second output mechanism being angled with the first output mechanism; and
an output control mechanism secured to the rotary shaft, the output control mechanism selected to engage the first output mechanism so that the multi-axis transmission is in a first state to output a first moment or to engage the second output mechanism so that the multi-axis transmission is in a second state to output a second moment.

2. The multi-axis transmission claimed of claim 1, wherein an electromagnet is secured to the frame, a magnetic element is secured to the housing, the electromagnet repels the magnetic element when the multi-axis transmission is in the first state, and the electromagnet attracts the magnetic element when the multi-axis transmission is the second state.

3. The multi-axis transmission claimed of claim 1, wherein a plurality of protrusions project from the housing, and a plurality of striations are formed on the frame, the protrusions mesh the striations.

4. The multi-axis transmission claimed of claim 1, wherein the output control mechanism comprises a first driving gear and a second driving gear, the first and second driving gears are spaced apart on and secured to the rotary shaft, the first driving gear meshes and drives the first output mechanism when the power switch is in the first state, the second driving gear meshes and drives the second output mechanism.

5. The multi-axis transmission claimed of claim 4, wherein both of the first and the second driving gears are conical gears.

6. The multi-axis transmission claimed of claim 1, wherein the second output mechanism comprises a slave element, a driving element, two retaining elements, and a revolving shaft, the revolving shaft is pivotally attached to the housing by the retaining elements, the slave element and the driving element are secured to the revolving shaft.

7. A multi-axis transmission comprising:
a frame;
a motor secured to the frame, the motor comprising a rotary shaft;
a housing, the housing axially slidably attached to the frame;
a first output mechanism secured to the housing;
a second output mechanism rotatably attached to the housing; and
an output control mechanism secured to the rotary shaft, the output control mechanism selected to engage the first output mechanism to output a first moment or to engage the second output mechanism to output a second moment angled with the first moment.

8. The multi-axis transmission claimed of claim 7, wherein an electromagnet is secured to the frame, a magnetic element is secured to the housing, the electromagnet repels the magnetic element when the multi-axis transmission outputs the first moment, and the electromagnet attracts the magnetic element when the multi-axis transmission outputs the first moment.

9. The multi-axis transmission claimed of claim 7, wherein a plurality of protrusions project from the housing, and a plurality of striations are formed on the frame, the protrusions mesh the striations.

10. The multi-axis transmission claimed of claim 7, wherein the output control mechanism comprises a first driving gear and a second driving gear, the first and second driving gears are spaced apart on and secured to the rotary shaft, the first driving gear meshes and drives the first output mechanism, the second driving gear meshes and drives the second output mechanism when the power switch outputs the second moment.

11. The multi-axis transmission claimed of claim 10, wherein both of the first and the second driving gears are conical gears.

12. The multi-axis transmission claimed of claim 7, wherein the second output mechanism comprises a slave element, a driving element, two retaining elements, and a revolving shaft, the revolving shaft is pivotally attached to the housing by the retaining elements, the slave element and the driving element are secured to the revolving shaft.

* * * * *